United States Patent Office 3,157,679
Patented Nov. 17, 1964

3,157,679
PROCESS FOR THE PREPARATION OF 6α-METHYL-16-METHYLENE-STEROIDS
Karl-Heinz Bork, Griesheim, near Darmstadt, Germany, assignor to E. Merck Aktiengesellschaft, Darmstadt, Germany, a corporation of Germany
No Drawing. Filed Oct. 25, 1961, Ser. No. 147,458
Claims priority, application Germany, Oct. 29, 1960, M 46,980
10 Claims. (Cl. 260—397.4)

This invention relates to steroids. More particularly it is directed to the production of 6α-methyl-16-methylene steroids of the following Formula I:

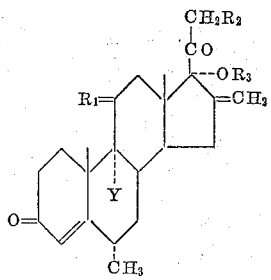

wherein:
$R_1$ is H,H; αH,βOH or O;
$R_2$ is H, OH or O-acyl;
$R_3$ is H or acyl; and
Y is H or F, and the corresponding 1-dehydro compounds.

Among the principal objects of the invention is the provision of a method of producing steroids of the aforesaid Formula I by catalytic hydrogenation of a steroid of the Formula II:

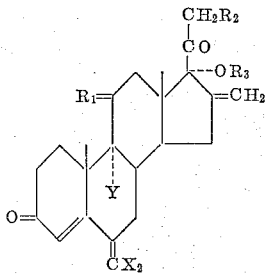

wherein:
$R_1$, $R_2$, $R_3$ and Y have the significance indicated, and
X is chlorine or bromine.

In accordance with the invention, it is furthermore possible to esterify the resultant final product in 17- and/or 21-position (if one starts with a compound of Formula II, in which $R_2$ is a hydroxyl group and/or $R_3$ is hydrogen) or to saponify it (if there is used as starting material a compound of Formula II, in which $R_2$ is an acyloxy group and/or $R_3$ is an acyl group).

Furthermore, if desired, another double bond can be introduced in 1,2-position.

The compounds obtained in accordance with the invention are steroids of good activity. The derivatives of the progesterone series have an excellent progestational action and are suitable, in particular, for oral application. The final products of the corticoid series have very good corticoid action.

The hydrogenation of a compound of Formula II is carried out under conditions which in themselves are customary. As the catalyst, there is advantageously used a noble-metal catalyst, such as palladium or platinum, possibly on a supporting substance, such as calcium carbonate, coal, strontium carbonate or barium sulfate. The hydrogenation is advantageously carried out in solution. As the solvents, there may be employed the solvents customarily used for such hydrogenations, as, for example, ethyl acetate, dioxane, the monomethyl ether of ethylene glycol or alcohols such as methanol or ethanol. It has furthermore been found advantageous to operate in the presence of a proton acceptor since the halogen is eliminated in this reaction in the form of hydrogen halide. As a proton acceptor, there can be used organic bases, particularly tertiary amines, such as trimethyl amine, triethyl amine or n-methyl piperidine. The reaction is advantageously carried out under normal pressure, and at room temperature.

The smooth course of the process in accordance with the invention could not be foreseen in advance, even by the man skilled in the art. Since, as a matter of fact, the starting material contains a methylene group in 16-position, it had to be assumed, i.e., one would have expected that, under the conditions of a catalytic hydrogenation, the 16-methylene group would be converted into a 16-methyl group, particularly in view of the fact that Belgian Patent No. 579,417, describes the conversion of 16-methylene-17α-hydroxy- or 17α-acyloxy steriods into 16-methyl-17α-hydroxy- or -17α-acyloxy steroids respectively by catalytic hydrogenation. The reaction conditions disclosed there correspond to the reaction conditions used for the present process. In particular, there are used in connection with the aforesaid Belgian patent, the same catalysts as in the present process.

It was therefore surprising that in the instant process in accordance with this invention, the 16-methylene group is not attacked. It was furthermore surprising that the hydrogenation need not be broken off after absorption of the calculated amount of hydrogen, but comes to a stop by itself, without the 16-methylene group being attacked. This surprising reaction course is without analogy in the field of steroids.

In accordance with the invention, there can also be used as starting material compounds of Formula II in which $R_2$ is O-acyl and/or $R_3$ is acyl. Acylation of an OH group in 17- and/or 21-position is however also still possible after the hydrogenation in accordance with the method of the invention. Such an esterification takes place under the reaction conditions customary therefor. Thus, for instance, the acid radical can be introduced by reaction with the corresponding acid or a derivative thereof suitable for esterification, such as an acid anhydride, or an acid chloride. For the esterification of the 17α-hydroxyl group, there are suitable, in particular, aliphatic monocarboxylic acids having up to 12 carbon atoms, such as formic acid, acetic acid, propionic acid, caproic acid and other higher homologs. The O-acyl group in 21-position preferably contains the acid radicals of the following acids:

Aliphatic monocarboxylic acids having up to 12 C-atoms; furthermore, acids such as succinic acid, aminoacetic acid, diethylamino acetic acid, tetrahydrophthalic acid, phosphoric acid or sulfuric acid.

For the saponification of any ester groups present in the molecule in 17- and/or 21-position, there are preferably used aqueous or alcoholic alkaline solutions, for instance, sodium hydroxide, potassium carbonate or sodium bicarbonate solutions, in customary manner. One advisedly operates in this connection with the exclusion of oxygen.

The 1,2-dehydrogenation of a compound of Formula II is effected, preferably, microbiologically. Particularly suitable micro-organisms are *Bacillius sphaericus* and *Corynebacterium simplex*. In order to carry out the reaction the starting material is added to a submerged culture of the micro-organism employed which grows in a suitable nutrient solution at optimum temperature and strong aeration by the customary methods of fermentation technique. Instead of growing cultures, suspensions of the micro-organisms in buffer solution can also be used, the technique being otherwise unchanged. The reaction is followed up chromatographically and the fermentation solution extracted for instance with chloroform after the conversion of the starting material.

It is, of course, also possible to oxidize to keto-groups any of the hydroxyl groups present in the molecular, particularly those in 11-position, after the hydrogenation of the 6,6-dihalo methylene compounds. Such an oxidization is preferably carried out under mild conditions, as for instance, by treatment of an 11-hydroxy steroid with a mixture of chromic anhydride and pyridine or chromic acid in acetone.

In accordance with the invention, the following steroids for instance are obtained:

$6\alpha$-methyl-16-methylene-17$\alpha$-hydroxy-progesterone and its 17-acylates,
$6\alpha$-methyl-16-methylene-11$\beta$,17$\alpha$-dihydroxy-progesterone and its 17-acylates,
$9\alpha$-fluoro-6$\alpha$-methyl-16-methylene-11$\beta$,17$\alpha$-dihydroxy-progesterone and its 17-acylates,
$9\alpha$-fluoro-6$\alpha$-methyl-16-methylene-11-keto-17$\alpha$-hydroxy-progesterone and its 17-acylates, as well as the 1-dehydro-derivatives of the foregoing compounds, furtheremore:

$6\alpha$-methyl-16-methylene-cortisol and -cortisone and their 21-acylates,
$6\alpha$-methyl-16-methylene-prednisolone and -prednisone and their 21-acylates,
$9\alpha$-fluoro-6$\alpha$-methyl-16-methylene-cortisol and -cortisone and their 21-acylates, as well as:

$9\alpha$-fluoro-6$\alpha$-methyl-16-methylene-prednisolone and -prednisone and their 21-acylates.

The compounds of Formula II required as starting material can be prepared, for example, from the 16-methylene steroids disclosed in Tetrahedron Letters, No. 16, 1960, pp. 21–32 by the method described by S. Liisberg et al. in Tetrahedron, vol. 9, page 149 (1960). In this connection, one advantageously starts for instance with a 3-enol ether of a $\Delta^4$-3-ketone; one can however also use the corresponding 3-enol acetate or a 3-ethylene ketal as starting material.

The steroids obtained by the method of the invention can be put up, possibly with the use of the customary adjuvants, into all pharmaceutical forms, such as tablets, pills, dragees, emulsions, solutions, injection solutions or sprays and are to be employed as pharmaceuticals.

The following are examples in accordance with this invention:

EXAMPLE 1

(a) 10.8 grams of 3-ethylenol ether of the 16-methylene-17$\alpha$-hydroxy-progesterone (melting point 172 to 174° C.; $(\alpha)_D$—229.3° (chloroform)) and 21 grams of tetrabromomethane are heated for 2 hours on a steam bath in 120 milliliters of collidine. After the cooling, the reaction mixture is poured into excess dilute hydrochloric acid and extracted with ether. The extracts are washed with water, dried over sodium sulfate and evaporated under reduced pressure. The oily residue crystallizes upon rubbing with methanol. The pure 6,6-dibromomethylene - 16 - methylene - 17$\alpha$ - hydroxy - progesterone, after recrystallization from methanol, melts at 234° C. (decomposition). $\lambda_{max}$ 251 m$\mu$ ($\epsilon$=10700) and 283 m$\mu$ ($\epsilon$=7100); $(\alpha)_D$+130.6° (chloroform).

(b) A solution of 10.2 grams of 6,6-dibromomethylene-16-methylene-17$\alpha$-hydroxy-progesterone in 250 ml. of dioxane is shaken, after addition of 2.8 ml. of triethylamine and 12 grams of 2% palladium-calcium-carbonate catalyst, with hydrogen under normal conditions. After 80 minutes, the amount calculated for 3 equivalents of hydrogen (1.48 liters) has been absorbed and the hydrogenation velocity drops rapidly. The hydrogenation solution is separated from the catalyst, treated with 25 ml. of normal hydrochloric acid and stirred after 1 hour into 4 liters of water. The crystalline precipitate is removed by suction filtration, dried and recrystallized from acetone. The pure 6$\alpha$-methyl-16-methylene-17$\alpha$-hydroxy-progesterone melts at 204–206° C. $\lambda_{max}$ 240.5 m$\mu$, $\epsilon$=16500; $(\alpha)_D$—26.6° (chloroform).

(c) 4.3 grams of the compound obtained in this manner are set aside with 4.3 grams of p-toluene sulfonic acid, 80 ml. of glacial acetic acid and 20 ml. of acetic anhydride for 24 hours at room temperature. The dark solution is poured into water, the precipitate removed by suction filtration, dissolved in about 20 ml. of methanol and treated with 2 ml. of concentrated hydrochloric acid. After 3 hours at 50° C., it is poured into water, the 6$\alpha$ - methyl - 16 - methylene - 17$\alpha$ - acetoxy - progesterone is isolated and recrystallized from methanol. Melting point 205 to 207° C.; $\lambda_{max}$ 240 m$\mu$, $\epsilon$=17200; $(\alpha)_D$—66.6° (chloroform).

EXAMPLE 2

(a) 2.4 grams of crude 3-ethylenol ether of 16-methylene-17$\alpha$-acetoxy-progesterone and 5.8 grams of tetrabromomethane are heated on a stream bath for 2 hours in 40 ml. of collidine. After cooling, the reaction mixture is poured into excess dilute hydrochloric acid and extracted with chloroform. The chloroform extracts are washed with water, dried over sodium sulfate and concentrated. The oily residue is dissolved in a small amount of benzene and introduced into a chromatography column consisting of 300 grams of Florisil. The 6,6-dibromomethylene-16-methylene-17$\alpha$-acetoxy progesterone is eluted with a mixture of equal parts of benzene and chloroform. After recrystallization from methanol, it melts at 187 to 189° C.

As starting material for this reaction, there can also be used the 3-enol acetate of 16-methylene-17$\alpha$-acetoxy-progesterone (melting point 172 to 175° C.; $(\alpha)_D$—144° (chloroform)) or the corresponding 3-ethylene ketal (melting point 218 to 220° C.).

(b) 2.5 grams of 6,6-dibromomethylene-16-methylene-17$\alpha$-acetoxy-progesterone are shaken under hydrogen at atmospheric pressure in 50 ml. of dioxane which contains 1.25 ml. of triethylamine, employing 3 grams of a 2% palladium-calcium-carbonate catalyst. After absorption of 340 ml. of hydrogen—corresponding to 3 equivalents—within 50 minutes the hydrogenation comes to a standstill. The hydrogenation solution is separated from the catalyst, set aside with 5 ml. normal hydrochloric acid for 1 hour at room temperature whereupon water is added, with rubbing, until the crystalline 6$\alpha$-methyl-16-methylene-17$\alpha$-acetoxy-progesterone separates out. After drying, the precipitate is recrystallized from a small amount of methanol. Melting point 205 to 207° C.; $\lambda_{max}$ 240 m$\mu$, $\epsilon$=17200; $(\alpha)_D$—66.6° (chloroform).

EXAMPLE 3

(a) In a manner similar to Example 2(a), 6,6-dibromomethylene-9$\alpha$-fluoro-16-methylene - 4 - pregnene-11$\beta$,17$\alpha$-diol-3,20-dione-17-acetate is prepared from the 3-ethyleno-ether of 9$\alpha$-fluoro-16-methylene-4-pregnene-11$\beta$,17$\alpha$-diol-3,20-dione-17-acetate.

(b) In a manner similar to Example 2(b), 6$\alpha$-methyl-9$\alpha$-fluoro-16-methylene-4-pregnene - 11$\beta$,17$\alpha$-diol-3,20-dione-17-acetate. Melting point 261 to 262°; $(\alpha)_D$—73.6° 9$\alpha$-fluoro-16-methylene-4-pregnene - 11$\beta$,17$\alpha$-diol-3,20-dione-17-acetate. Melting point 261 to 262°; $(\alpha)_D$—73.6° (chloroform), $\lambda_{max}$ 238–239 m$\mu$, $\epsilon$=13500.

(c) 1.9 grams of 6$\alpha$-methyl-9$\alpha$-fluoro-16-methylene-4-pregnene-11$\beta$,17$\alpha$-diol-3,20-dione-17-acetate are dissolved in 19 ml. of pyridine and treated at +5° C. with a mixture of 1.9 grams of chromic anhydride and 19 ml. of pyridine. After 18 hours, the reaction mixture is poured into 200 ml. of ethyl acetate, and the precipitate removed by suction filtration and washed thoroughly with ethyl acetate. The combined ethyl acetate solutions are concentrated, the 6α-methyl-9α-fluoro - 16 - methylene - 4 - pregnene-17α-ol-3,11,20-trione-acetate crystallizing out.

(d) A solution of 1.1 gram of 6α-methyl-9α-fluoro-16-methylene-4-pregnene-17α-ol-3,11,20-trione-acetate in 30 ml. of methanol is treated, while nitrogen is passed through, with an oxygen-free solution of 0.11 grams of sodium hydroxide in 5 ml. of methanol. After heating for 10 minutes, the solution is neutralized with 1 N sulfuric acid and poured into water. The 6α-methyl-9α-fluoro-16-methylene-4-pregnene-17α-ol-3,11,20-trione which precipitates is recrystallized from acetone.

EXAMPLE 4

(a) In a manner similar to Example 2(b), 6,6-dibromomethylene-9α-fluoro-16-methylene - 4 - pregnene-11β,17α-diol-3,20-dione-17-acetate is hydrogenated forming 6α-methyl-9α-fluoro-16-methylene-4-pregnene - 11β,17α-diol-3,20-dione-17 acetate. Melting point 261–262° C.

(b) In a manner similar to Example 3(d), 6α-methyl-9α-fluoro-16-methylene-4-pregnene-11β,17α - diol - 3,20-dione-17-acetate is saponified by treatment with the molar quantity of methanolic sodium hydroxide to form 6α-methyl-9α-fluoro-16-methylene-4-pregnene - 11β,17α - diol-3,20-dione.

($c_1$) In a fermenter, 10 liters of a nutrient solution of 1% yeast extract are inoculated with 0.5 liters of a shaken culture of Corynebacterium simplex. With strong aeration and agitation, the culture is treated after 10 hours with an addition of 5 grams of 6α-methyl-9α-fluoro-16-methylene-4-pregnene - 11β,17α - diol-3,20-dione in 150 ml. of methanol. After about 10 to 12 hours, the dehydrogenation (the course of which is followed up chromatographically) is complete. The fermentation brew is extracted several times with coloroform; the combined extracts are concentrated by evaporation and the 6α-methyl-9α-fluoro-16-methylene-1,4-pregnadiene - 11β,17α - diol-3,20-dione thus obtained is recrystallized from methanol.

($c_2$) In a 15 liter fermenter, 12 liters of a nutrient solution of 1% yeast extract are inoculated with 0.8 liters of a shaken culture of Bacillus sphaericus. After a period of growth of about 10 hours, there is added to the culture, with strong aeration and agitation, 7.6 grams of 6α-methyl-9α-fluoro-16-methylene - 4 - pregnene - 11β,17α-diol-3,20-dione. After 20 to 22 hours, the dehydrogenation is complete and the 6α-methyl-9α-fluoro-16-methylene-1,4-pregnadiene-11β,17α-diol-3,20-dione is isolated from the fermentation brew in the same manner as in Example 4($c_1$).

EXAMPLE 5

(a) In a manner similar to Example 1(a), 6,6-dibromomethylene-16-methylene-hydrocortisone-21-acetate is prepared from the ethylenol ether of 16-methylene-hydrocortisone-21-acetate with tetrabromomethane.

(b) In a manner similar to Example 1(b), 6,6-dibromomethylene-16-methylene-hydrocortisone-21-acetate is hydrogenated to form 6α-methyl-16-methylene-hydrocortisone-21-acetate.

(c) 2 grams of 6α-methyl-16-methylene-hydrocortisone-21-acetate are dissolved in 20 ml. of nitrogen-saturated methanol and treated, with simultaneous introduction of nitrogen, with 3.8 ml. of 10% potassium carbonate solution which has also been saturated with nitrogen. The reaction mixture is stirred for 30 minutes at room temperature, neutralized with glacial acetic acid and diluted with water. The 6α-methyl-16-methylene-hydrocortisone is extracted with chloroform and crystallized after the concentration of the extracts.

(d) In a manner similar to Example 4($c_1$) or 4($c_2$), 6α-methyl-16-methylene-prednisolone is prepared from 6α-methyl-16-methylene-hydrocortisone.

EXAMPLE 6

(a) In a manner similar to Example 1(a), 6,6-dibromomethylene-16-methylene-cortisone-21-acetate is obtained with tetrabromomethane from the ethylenol ether of 16-methylene-cortisone-21-acetate with tetrabromomethane.

(b) In a manner similar to Example 1(b), 6,6-dibromomethylene-16-methylene-cortisone-21-acetate is hydrogenated to form 6α-methyl-16-methylene-cortisone-acetate.

(c) In a manner similar to Example 5(c), 6α-methyl-16-methylene-cortisone-acetate is saponified to form 6α-methyl-16-methylene-cortisone.

(d) In a manner similar to Example 4($c_1$) or 4($c_2$), 6α-methyl-16-methylene-prednisone is prepared from 6α-methyl-16-methylene-cortisone.

EXAMPLE 7

(a) In a manner similar to Example 1(a), 6,6-dibromomethylene - 9α - fluoro - 16 - methylene-hydrocortisone-21-acetate is prepared from the ethylenol ether of 9α - fluoro - 16-methylene-hydrocortisone-21-acetate with tetrabromomethane.

(b) In a manner similar to Example 1(b), 6,6-dibromomethylene - 9α - fluoro - 16 - methylene-hydrocortisone-21-acetate is hydrogenated to form 6α-methyl-9α-fluoro-16-methylene-hydrocortisone-21-acetate.

(c) In a manner similar to Example 5(c), 6α-methyl-9α - fluoro-16-methylene-hydrocortisone-21-acetate is saponified to form 6α-methyl-9α-fluoro-16-methylene-hydrocortisone.

(d) In a manner similar to Example 4($c_1$) or 4($c_2$), 6α - methyl - 9α-fluoro-16-methylene-prednisolone is prepared from 6α-methyl-9α-fluoro-16-methylene-hydrocortisone.

EXAMPLE 8

(a) In a manner similar to Example 1(a), 6,6-dibromomethylene - 9α - fluoro - 16 - methylene - cortisone-21-acetate is prepared from the ethylenol ether of 9α-fluoro-16-methylene-cortisone-21-acetate.

(b) In a manner similar to Example 1(b), 6,6-dibromomethylene - 9α - fluoro - 16 - methylene - cortisone-21-acetate is hydrogenated to form 6α-methyl-9α-fluoro-16-methylene-cortisone-21-acetate.

(c) In a manner similar to Example 5(c), 6α-methyl-9α-fluoro-16-methylene-cortisone-21-acetate is saponified to form 6α-methyl-9α-fluoro-16-methylene cortisone.

(d) In a manner similar to Example 4($c_1$) or 4($c_2$), 6α-methyl-9α-fluoro-16-methylene-prednisone is prepared from 6α-methyl-9α-fluoro-16-methylene-cortisone.

EXAMPLE 9

(a) 10.4 grams of the 3-ethylenol ether of 16-methylene-hydrocortisone-21-acetate are allowed to stand for 45 hours at room temperature in a mixture of 60 ml. of dioxane, 5 ml. of pyridine and 10 ml. of trichlorobromomethane. The reaction mixture is filtered and the filtrate is poured into 1000 ml. of water. The precipitated 6-trichloromethyl - 16-methylene-hydrocortisone-21-acetate is dissolved in 150 ml. of pyridine. The obtained solution is heated to 110° for 30 minutes and after cooling is poured into 2000 ml. of water. The thus obtained 6,6-dichloromethylene - 16-methylene-hydrocortisone-21-acetate is recrystallized from methanol.

(b) 4.3 grams of 6,6-dichloromethylene-16-methylene-hydrocortisone-21-acetate are shaken with hydrogen at atmospheric pressure in 100 ml. of dioxane containing 1.3 ml. of triethylamine in the presence of 5 grams of a 5% palladium-calcium carbonate catalyst. After absorption of 591 ml. of hydrogen—corresponding to 3 equivalents—the hydrogenation comes to a standstill. The hydrogenation solution is separated from the catalyst and set aside with 10 ml. in hydrochloric acid for 1 hour at room temperature. Upon addition of water the 6α-methyl-16-methylene-hydrocortisone-21-acetate separates which is recrystallized from methanol.

The same results are obtained when using as a catalyst platinum on active carbon or platinum obtained in the usual way by reduction of platinum dioxide instead of palladium.

To obtain the 6α-methyl-16-methylene-hydrocortisone, the corresponding 21-acetate is saponified in accordance with the method of Example 5(c).

EXAMPLE 10

(a) In a manner similar to Example 9(a), 6,6-dichloromethylene-16-methylene-cortisone-21-acetate is prepared from the 3-ethylenol-ether of 16-methylene-cortisone-21-acetate by reaction with trichlorobromo-methane.

(b) In a manner similar to Example 9(b), 6,6-dichloromethylene-16-methylene-cortisone-21-acetate is hydrogenated to form 6α-methyl-16-methylene-cortisone-21-acetate.

EXAMPLE 11

(a) 5.9 grams of 6,6-dibromomethylene-16-methylene-17α-hydroxy-progesterone obtained according to Example 1(a) and 5.9 grams of para-toluene-sulfonic acid are dissolved in a mixture of 90 ml. of glacial acetic acid and 23 ml. of acetic anhydride. After standing 24 hours at room temperature, the dark solution is poured into water. The crude precipitated 6,6-dibromomethylene-16-methylene-17α-acetoxy-progesterone is filtered off, dried and recrystallized from methanol with addition of small quantities of charcoal. Melting point 187 to 189° C.; $\lambda_{max}$ 250 mµ ($\epsilon$=10000) and 248 mµ ($\epsilon$=6100); $(\alpha)_D$+90.6° (chloroform).

(b) In a manner similar to Example 2(b), 6,6-dibromomethylene - 16-methylene-17α-acetoxy-progesterone is hydrogenated to form 6α-methyl-16-methylene-17α-acetoxy-progesterone.

16-methylene-17α-acetoxy progesterone compounds are described in the U.S. patent application of the applicant, Karl-Heinz Bork, and other co-inventors, Serial No. 84,987 filed January 26, 1961.

It will be understood that the foregoing description of the invention and the examples set forth are merely illustrative of the principles thereof. Accordingly, the appended claims are to be construed as defining the invention within the full spirit and scope thereof.

I claim:

1. In a process of preparing 6α-methyl-16-methylene steroids selected from the group consisting of compounds of the Formula I:

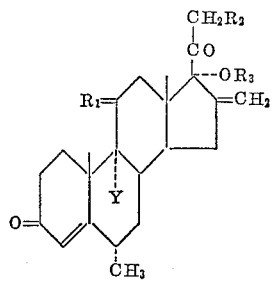

wherein:

$R_1$ is a member of the group consisting of (H,H), (αH,βOH), and keto;

$R_2$ is a member of the group consisting of H, OH and O—$R_4$;

$R_3$ is a member of the group consisting of H and $R_5$; and $R_4$ is a member of the group consisting of the acid moieties of alkanoic acids having a carbon content up to 12 carbon atoms, succinic acid, amino acetic acid, diethylamino acetic acid, tetrahydrophthalic acid, phosphoric acid and sulfuric acid;

$R_5$ is a member of the group consisting of the acid moieties of alkanoic acids having a carbon content from 1 to 12 carbon atoms;

Y is a member of the group consisting of H and F and the 1-dehydro derivatives thereof the step which comprises treating with hydrogen a member of the group consisting of a compound of the Formula II:

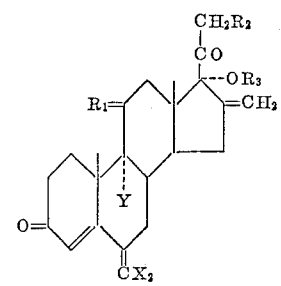

wherein:

$R_1$, $R_2$, $R_3$ and Y have the above meanings and wherein:

X is a member of the group consisting of chlorine and bromine and the 1-dehydro derivatives thereof, in the presence of a catalyst selected from the group consisting of palladium and platinum and a proton acceptor at about atmospheric pressure and at about room temperature.

2. Process of preparing 6α-methyl-16-methylene-steroids of the Formula I:

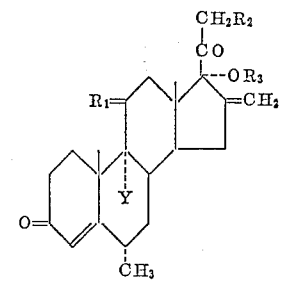

wherein:

$R_1$ is a member of the group consisting of (H,H), (αH,βOH) and O;

$R_2$ is a member of the group consisting of H, OH and O-alkanoyl;

$R_3$ is a member of the group consisting of H and alkanoyl; and

Y is a member of the group consisting of H and F which comprises subjecting a steroid of the Formula II:

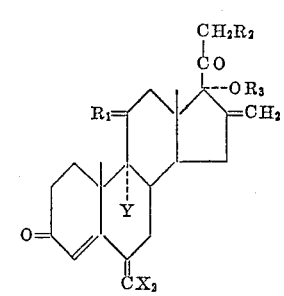

wherein:

$R_1$, $R_2$, $R_3$ and Y have the above significance; and

X is a member of the group consisting of chlorine and bromine to the hydrogenation by the action of hydrogen in the presence of a noble metal catalyst and a proton acceptor.

3. Method in accordance with claim 2 wherein the proton acceptor is a tertiary amine.

4. Method in accordance with claim 2 wherein the proton acceptor is a member of the group consisting of trimethylamine, triethylamine and N-methylpiperidine.

5. Method of converting 6,6-dibromomethylene-16-methylene-17α-hydroxy-progesterone to 6α-methyl-16-methylene-17α-hydroxy-progesterone which comprises hydrogenating 6,6-dibromomethylene-16-methylene-17α-hydroxy-progesterone in the presence of a solvent, a proton acceptor and a catalyst selected from the group consisting of palladium and platinum.

6. Method in accordance with claim 5 wherein the proton acceptor is trimethylamine.

7. Method of converting 6,6-dibromomethylene-16-methylene-17α-acetoxy-progesterone to 6α - methyl-16-methylene-17α-acetoxy-progesterone which comprises hydrogenating 6,6-dibromomethylene-17α-acetoxy-progesterone in the presence of a solvent, a proton acceptor and a catalyst selected from the group consisting of palladium and platinum.

8. Method in accordance with claim 7 wherein the proton acceptor is trimethylamine.

9. Method of converting 6,6-dibromomethylene-16-methylene-hydrocortisone-21-acetate to 6α - methyl-16-methylene-hydrocortisone-21-acetate which comprises hydrogenating 6,6 - dibromomethylene - 16 - methylene - hydrocortisone-21-acetate in the presence of a solvent, a proton acceptor and a catalyst selected from the group consisting of palladium and platinum.

10. Method in accordance with claim 9 wherein the proton acceptor is trimethylamine.

References Cited in the file of this patent
UNITED STATES PATENTS

| | | |
|---|---|---|
| 2,865,808 | Agnello et al. | Dec. 23, 1958 |
| 3,047,566 | Godtfredsen et al. | July 31, 1962 |

OTHER REFERENCES

Bowers et al.: "J. Am. Chem. Soc.," vol. 80, June 20, 1958, pp. 3091–3093.

Mannhardt et al.: "Tetrahedron Letters," July 1960, No. 16, pages 21–32.